United States Patent
Kim et al.

(10) Patent No.: US 9,762,367 B2
(45) Date of Patent: Sep. 12, 2017

(54) METHOD FOR TRANSMITTING AND RECEIVING SIGNAL IN WIRELESS COMMUNICATIONS SYSTEM AND APPARATUS THEREFOR

(71) Applicant: LG ELECTRONICS INC., Seoul (KR)

(72) Inventors: Myoungseob Kim, Seoul (KR); Seungmin Lee, Seoul (KR); Inkwon Seo, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 14/773,128

(22) PCT Filed: Mar. 7, 2014

(86) PCT No.: PCT/KR2014/001894
§ 371 (c)(1),
(2) Date: Sep. 4, 2015

(87) PCT Pub. No.: WO2014/137186
PCT Pub. Date: Sep. 12, 2014

(65) Prior Publication Data
US 2016/0013909 A1     Jan. 14, 2016

Related U.S. Application Data

(60) Provisional application No. 61/773,820, filed on Mar. 7, 2013.

(51) Int. Cl.
    *H04L 5/00*           (2006.01)

(52) U.S. Cl.
CPC .......... *H04L 5/0053* (2013.01); *H04L 5/0048* (2013.01)

(58) Field of Classification Search
CPC .... H04L 5/0053; H04L 5/0051; H04L 5/0007
See application file for complete search history.

(56) References Cited

U.S. PATENT DOCUMENTS

| | | |
|---|---|---|
| 2011/0194536 A1 | 8/2011 | Kim et al. |
| 2012/0207119 A1 | 8/2012 | Zhang et al. |

(Continued)

FOREIGN PATENT DOCUMENTS

| | | |
|---|---|---|
| KR | 10 2011-0086523 A | 7/2011 |
| KR | 10-2011-0093564 A | 8/2011 |

(Continued)

*Primary Examiner* — Albert T Chou
(74) *Attorney, Agent, or Firm* — Birch, Stewart, Kolasch & Birch, LLP

(57) ABSTRACT

According to an embodiment of the present invention, a method for transmitting and receiving a signal in a wireless communications system includes the steps of: transmitting an uplink data in a first subframe to a base station; and receiving a reception confirmation response to the uplink data on a downlink time-frequency resource of a second subframe associated with the first subframe, wherein if the second subframe transmits a shortened DMRS (Demodulation Reference Signal), the downlink time-frequency resource is included in at least a part of REs (Resource Elements) adjacent to the RE (Resource Element) transmitting the shortened DMRS, and the RE transmitting the shortened DMRS is the cell specified one of the REs capable of being reserved for the DMRS.

13 Claims, 16 Drawing Sheets

(a)

(b)

(56) References Cited

U.S. PATENT DOCUMENTS

| | | | |
|---|---|---|---|
| 2013/0021991 A1 | 1/2013 | Ko et al. | |
| 2013/0182664 A1* | 7/2013 | Chen | H04W 72/042 370/329 |
| 2013/0336150 A1 | 12/2013 | Abe et al. | |
| 2014/0226636 A1* | 8/2014 | Xu | H04W 72/042 370/336 |
| 2014/0233407 A1* | 8/2014 | Pourahmadi | H04L 5/0007 370/252 |
| 2015/0304014 A1* | 10/2015 | Sadeghi | H04J 13/004 370/315 |
| 2016/0037491 A1* | 2/2016 | Hwang | H04L 5/0051 370/330 |

FOREIGN PATENT DOCUMENTS

| | | |
|---|---|---|
| KR | 10-2012-0060900 A | 6/2012 |
| WO | WO 2012/108928 A1 | 8/2012 |
| WO | WO 2012/111623 A1 | 8/2012 |

* cited by examiner

FIG. 6
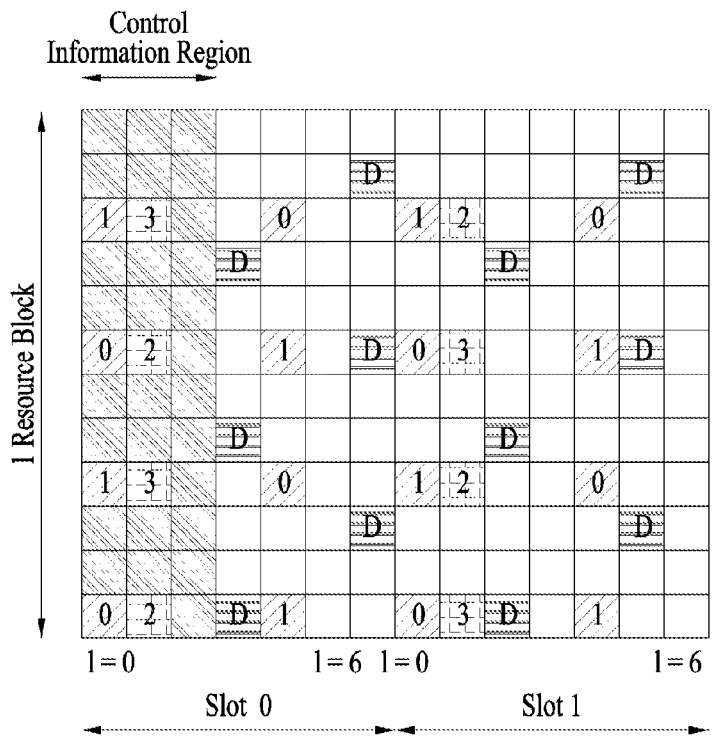
(a)
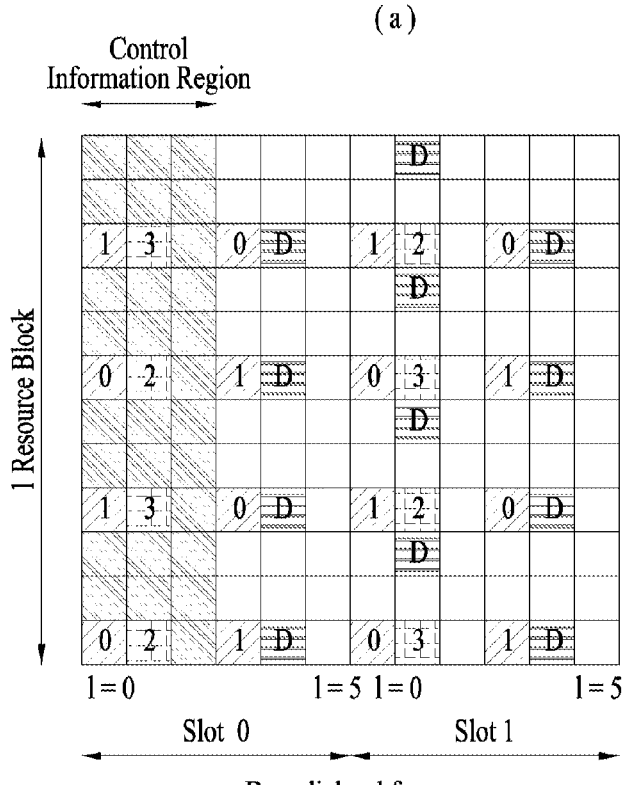
(b)

FIG. 8

FIG. 9
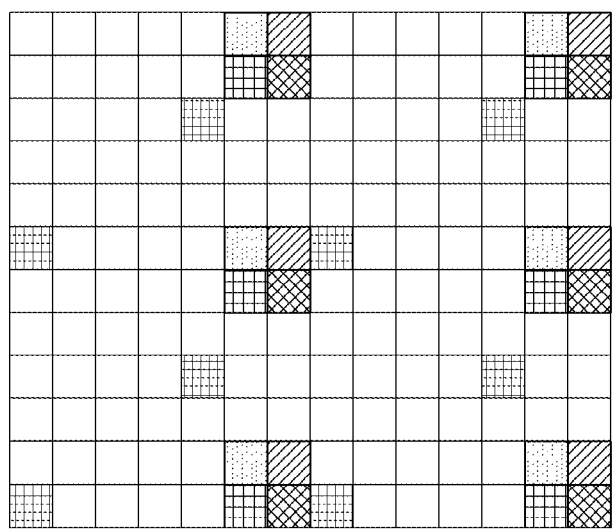
- REs for DM-RS pattern #0
- REs for DM-RS pattern #1
- REs for DM-RS pattern #2
- REs for DM-RS pattern #3
(a)
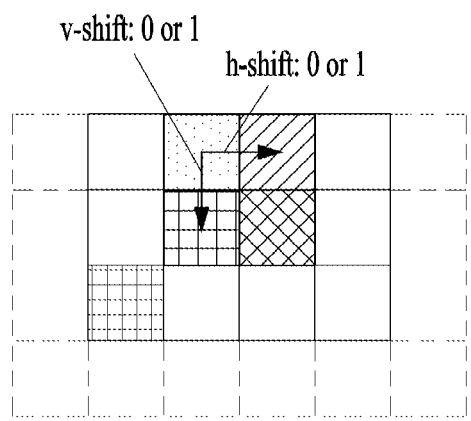
(b)

FIG. 10
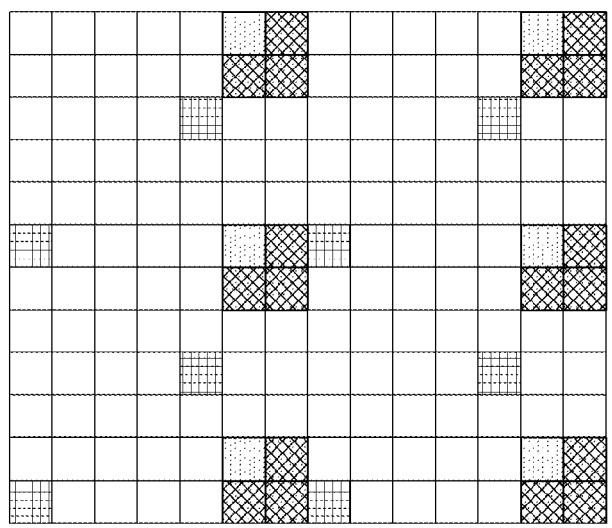
☐ REs for DM-RS pattern #0
▨ REs for EPHICH
(on a cell with DM-RS pattern #0)
(a)
DM-RS pattern #0
(v-shift: 0, h-shift: 0)
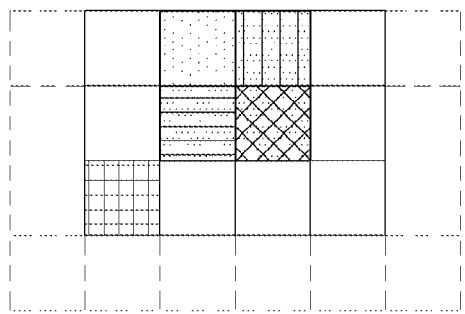
(b)

FIG. 16
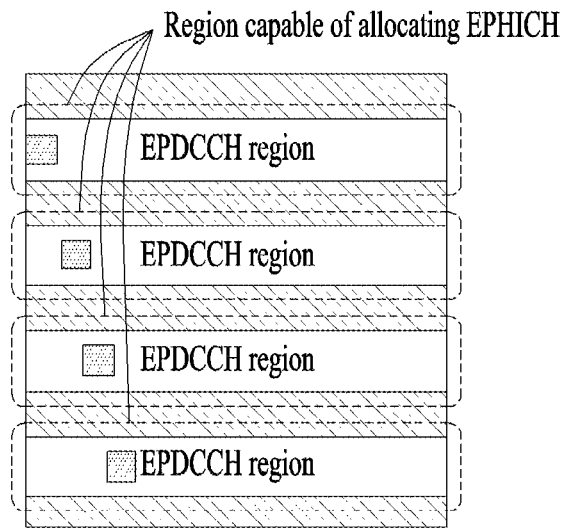
(a)
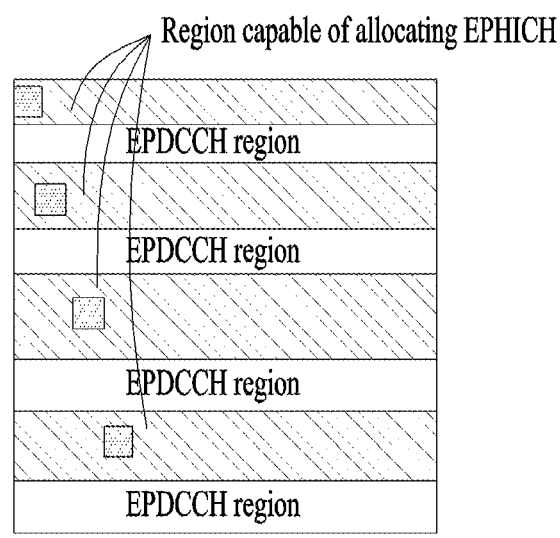
(b)

METHOD FOR TRANSMITTING AND RECEIVING SIGNAL IN WIRELESS COMMUNICATIONS SYSTEM AND APPARATUS THEREFOR

CROSS REFERENCE TO RELATED APPLICATIONS

This application is the National Phase of PCT International Application No. PCT/KR2014/001894, filed on Mar. 7, 2014, which claims priority under 35 U.S.C. 119(e) to U.S. Provisional Application No. 61/773,820, filed on Mar. 7, 2013, all of which are hereby expressly incorporated by reference into the present application.

TECHNICAL FIELD

The present invention relates to a wireless communication system, and more particularly, to a method and apparatus for transmitting and receiving a signal related to an EPHICH (Enhanced Physical Hybrid automatic repeat request Indicator Channel).

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention is to provide a structure for an EPHICH and a disclosure related to the EPHICH.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first technical aspect of the present invention, a method for enabling a user equipment to transmit and receive a signal in a wireless communication system comprises the steps of transmitting uplink data in a first subframe to a base station; and receiving an acknowledgement ACK for the uplink data on a downlink time-frequency resource of a second subframe associated with the first subframe, wherein, if a shortened DMRS (Demodulation Reference Signal) is transmitted in the second subframe, the downlink time-frequency resource is included in at least a part of REs (Resource Elements) adjacent to REs to which the shortened DMRS is transmitted, and the REs to which the shortened DMRS is transmitted are determined cell-specifically among REs capable of being reserved for the DMRS.

In a second technical aspect of the present invention, a user equipment for receiving control information through an EPDCCH in a wireless communication system comprises a reception module; and a processor, wherein the processor transmits uplink data in a first subframe to a base station and receives an acknowledgement ACK for the uplink data on a downlink time-frequency resource of a second subframe associated with the first subframe, and if a shortened DMRS (Demodulation Reference Signal) is transmitted in the second subframe, the downlink time-frequency resource is included in at least a part of REs (Resource Elements) adjacent to REs to which the shortened DMRS is transmitted, and the REs to which the shortened DMRS is transmitted are determined cell-specifically among REs capable of being reserved for the DMRS.

The first technical aspect and the second technical aspects of the present invention may include one or more of the followings.

The second subframe may be either a subframe at which an EPHICH (Enhanced Physical Hybrid automatic repeat request Indicator Channel) is configured, or a subframe indicated through higher layer signaling.

The REs to which the shortened DMRS is transmitted may be determined by the least significant bit (LSB) of cell ID.

The REs to which the shortened DMRS is transmitted may be obtained by shifting REs corresponding to subcarriers 1, 6 and 11 of an OFDM symbol #5 of each slot to a frequency axis as much as the LSB and shifts the corresponding REs to a time axis as much as a second LSB.

The REs capable of being reserved for the DMRS may be REs obtained after the corresponding REs are shifted to the frequency axis or the time axis.

The downlink time-frequency resource may be determined UE-specifically among the REs capable of being reserved for the DMRS.

The ACK may be transmitted on a fallback mode resource for a modification period generated as the REs to which the DMRS is transmitted are reconfigured.

The fallback mode resource may exist on a carrier indicated by higher layer signaling.

The user equipment may regard that ACK is received for the uplink data for the modification period.

The user equipment may repeatedly retransmit the uplink data for the modification period.

A DMRS which is not shortened may be transmitted for the modification period.

The shortened DMRS may be transmitted on a PRB pair only to which an EPDCCH (Enhanced Physical Downlink Control Channel) is transmitted.

Advantageous Effects

According to the present invention, transmission and reception of acknowledgement and non-acknowledgment may be performed through an EPHICH while interference between cells is being reduced.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incor- In the drawings:

FIG. 6 is a diagram illustrating a reference signal;

FIG. 8 is a diagram illustrating EREG (Enhanced Resource Element Group) to ECCE (Enhanced Control Channel Element) mapping;

FIGS. 9 to 12 are diagrams illustrating a shortened DMRS and EPHICH according to the embodiment of the present invention;

FIG. 16 is a diagram illustrating EPDCCH and EPHICH regions; and

BEST MODE FOR CARRYING OUT THE INVENTION

Figure 1:
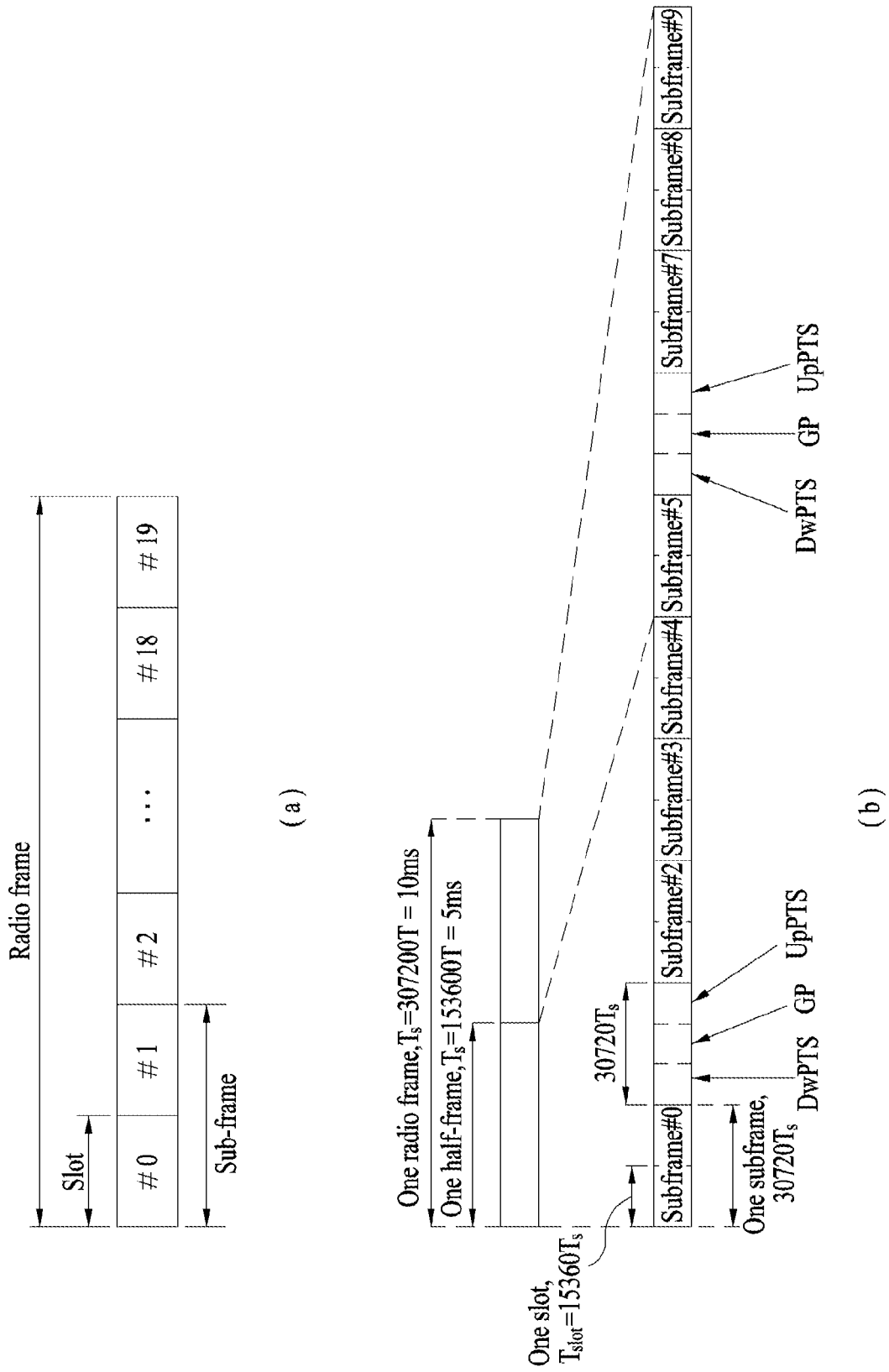
FIG. 1 is a diagram illustrating a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
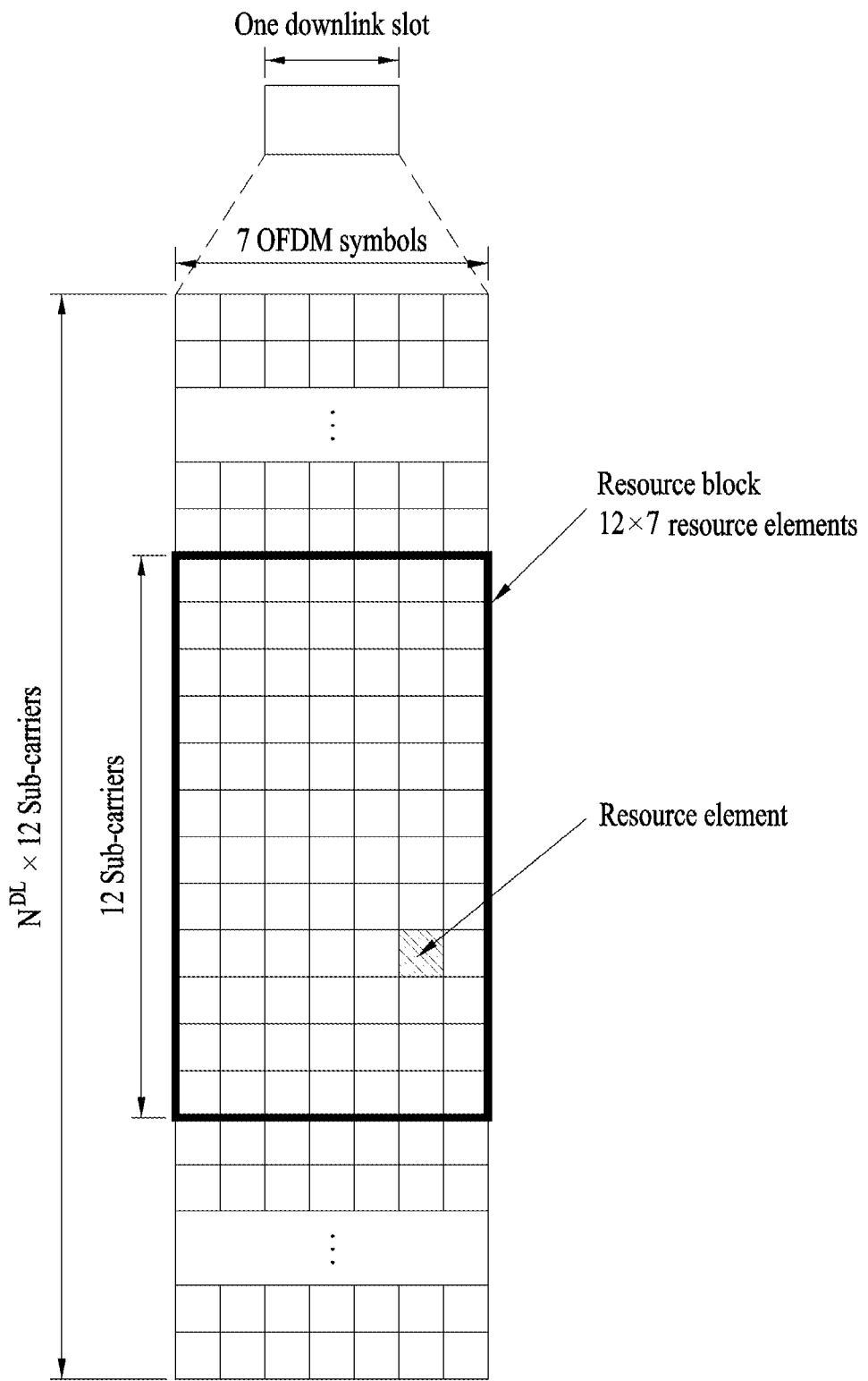
FIG. 2 is a diagram illustrating a resource grid at a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
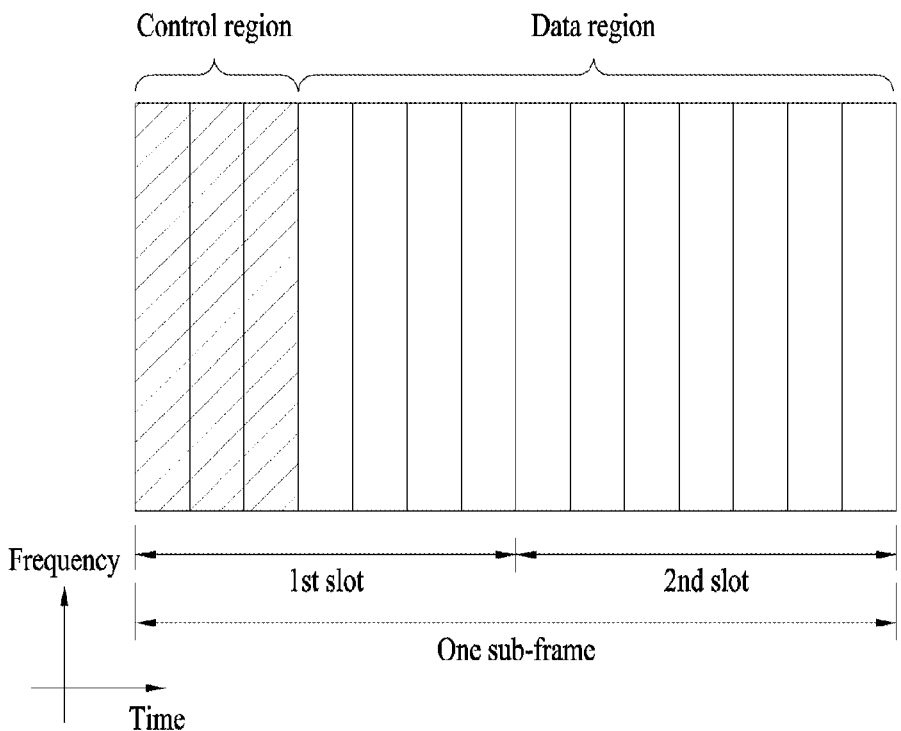
FIG. 3 is a diagram illustrating a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
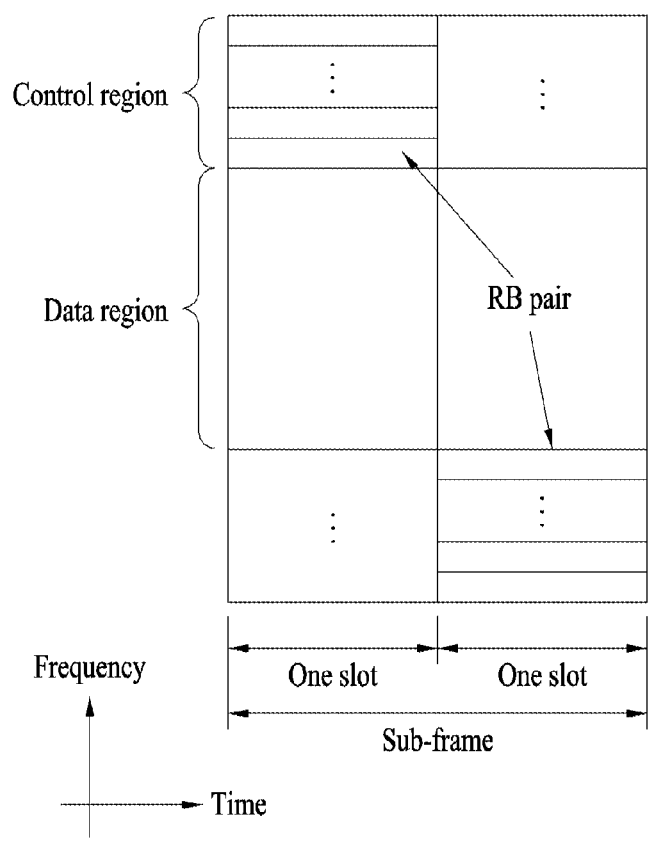
FIG. 4 is a diagram illustrating a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PHICH (Physical Hybrid-ARQ Indicator Channel)

Figure 5:
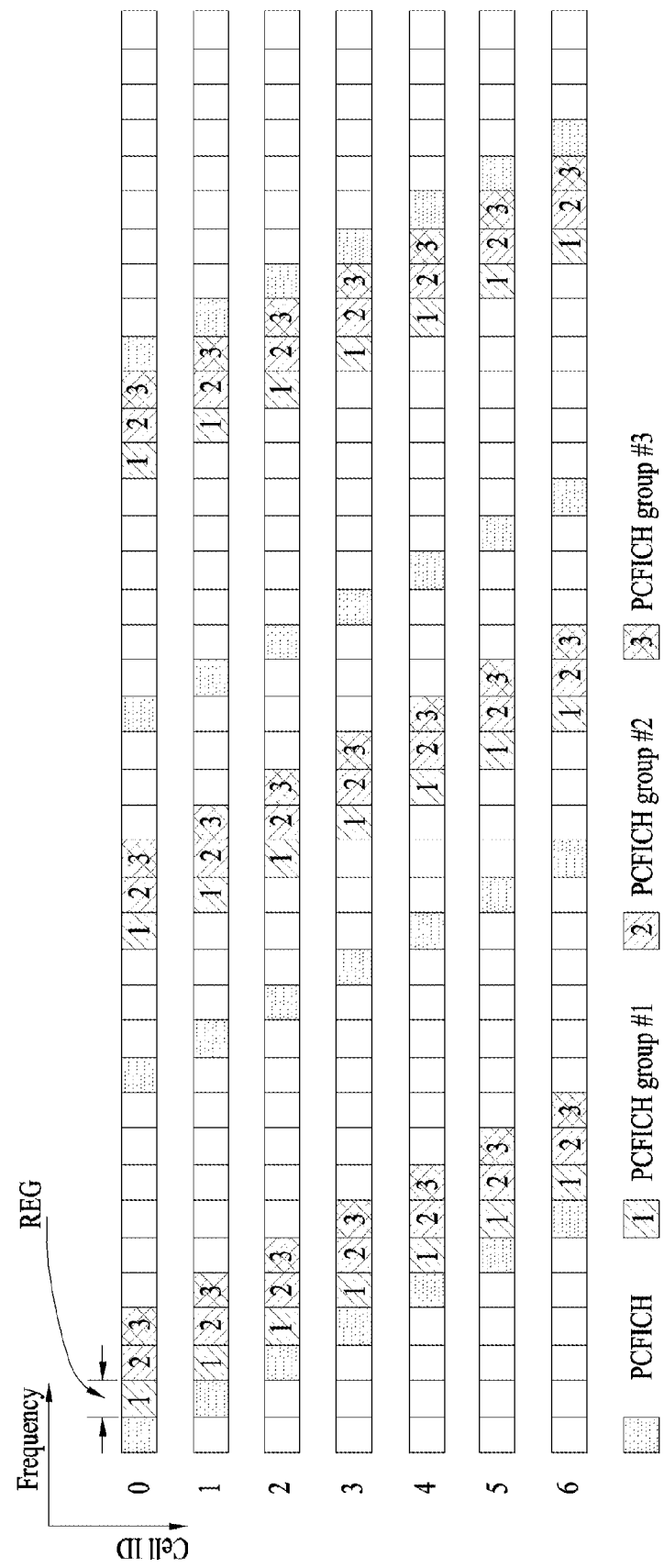
FIG. 5 is a diagram illustrating a PHICH.

FIG. 5 is a diagram illustrating positions of a PCFICH and a physical HARQ indicator channel (PHICH) generally applied to a specific bandwidth. ACK/NACK information for uplink data transmission is transmitted through a PHICH. A plurality of PHICH groups are configured at a single subframe, and a plurality of PHICHs exist in a single PHICH group. Therefore, PHICHs for a plurality of user equipments are included in a single PHICH group.

As shown in FIG. 5, PHICH allocation to each user equipment in a plurality of PHICH groups is performed using a lowest physical resource block (PRB) index of PUSCH resource allocation and a cyclic shift index for a demodulation reference signal (DMRS) transmitted through an uplink grant PDCCH. The DMRS is an uplink reference signal, and is provided along with uplink transmission so as to perform channel estimation for demodulation of uplink data. In addition, a PHICH resource is signaled through an index pair such as ($n_{PHICH}^{group}$, $n_{PHICH}^{seq}$). At this time, in the index pair ($n_{PHICH}^{group}$, $n_{PHICH}^{seq}$), $n_{PHICH}^{group}$ means a PHICH group number and $n_{PHICH}^{seq}$ means an orthogonal sequence index in the corresponding PHICH group. $n_{PHICH}^{group}$ and $n_{PHICH}^{seq}$ are defined as expressed by the following Equation 1.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad \text{[Equation 1]}$$

In the above Equation 1, $n_{DMRS}$ is a cyclic shift of a DMRS used for uplink transmission related to a PHICH, and is mapped to a value of a 'cycle shift for DMRS' field of the latest uplink grant control information (for example, DCI format 0 or 4) for a transport block (TB) associated with the corresponding PUSCH transmission. For example, the 'cyclic shift for DMRS' field of the latest uplink grant DCI format may have a size of 3 bits. If the 'cyclic shift for DMRS' field is set to "000", $n_{DMRS}$ may be set to zero '0'.

In the above Equation 1, $N_{SF}^{PHICH}$ is the size of a spreading factor used for PHICH modulation. $I_{PRB\_RA}^{lowest\_index}$ is the lowest PRB index of a first slot of the corresponding PUSCH transmission. $I_{PHICH}$ is set to a value of 1 only in a specific case (if UL/DL configuration is set to zero '0' and PUSCH transmission is performed at subframe n=4 or n=9) in a TDD system, and is set to zero '0' in the remaining cases other than the special case. $N_{PHICH}^{group}$ denotes the number of PHICH groups configured by a higher layer, and is defined as expressed by the following Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 2]}$$

In the above Equation 2, $N_g$ denotes information on the amount of PHICH resources transmitted to a physical broadcast channel (PBCH), and $N_g$ has a size of 2 bits long and is expressed by $N_g \in \{1/6, 1/2, 1, 2\}$. In the above Equation 2, $N_{RB}^{DL}$ denotes the number of resource blocks (RBs) configured in a downlink.

In addition, examples of orthogonal sequences defined in the legacy 3GPP LTE Release 8/9 are illustrated in the following Table 1.

TABLE 1

| Sequence index $n_{PHICH}^{seq}$ | Orthogonal sequence | |
| --- | --- | --- |
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Reference Signal (RS)

In the wireless communication system, since a packet is transmitted through a radio channel, signal distortion may occur during transmission of the packet. In order to normally receive the distorted signal in a receiving side, distortion of the received signal should be compensated using channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel status between each transmitting antenna and each receiving antenna should be known to receive a normal signal. Accordingly, a separate reference signal should exist per transmitting antenna, in more detail, per antenna port.

The reference signal may be divided into an uplink reference signal and a downlink reference signal. In the current LTE system, the uplink reference signal may include:

i) a demodulation reference signal (DM-RS) for channel estimation for coherent demodulation of information transmitted through the PUSCH and the PUCCH; and ii) a sounding reference signal (SRS) for allowing a base station to measure uplink channel quality at frequencies of different networks.

Meanwhile, the downlink reference signal may include:

i) a cell-specific reference signal (CRS) shared among all the user equipments within the cell;

ii) a user equipment (UE)-specific reference signal for a specific user equipment only;

iii) a demodulation reference signal (DM-RS) for coherent demodulation if the PDSCH is transmitted;

iv) channel state information-reference signal (CSI-RS) for transferring channel state information (CSI) if a downlink DMRS is transmitted;

v) a multimedia broadcast single frequency network (MBSFN) reference signal transmitted for coherent demodulation for a signal transmitted in an MBSFN mode; and vi) a positioning reference signal used to estimate geographic position information of the user equipment.

The reference signal may be divided into two types in accordance with its purpose. Namely, examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received even by a user equipment that does not receive downlink data for a specific subframe. Also, this reference signal for acquisition of channel information may be used even in case of handover status. The latter reference signal is transmitted from the base station together with a corresponding resource when the base station transmits downlink data. In this case, the user equipment may perform channel measurement by receiving the corresponding reference signal, whereby the user equipment may demodulate the data. This reference signal for data demodulation should be transmitted to a region to which data are transmitted.-

The CRS is used for both acquisition of channel information and data demodulation. The user equipment-specific reference signal is used for data demodulation only. The CRS is transmitted per subframe through a wideband. The reference signal for maximum four antenna ports is transmitted depending on the number of transmitting antennas of the base station.

For example, if the number of transmitting antennas of the base station is two, the CRS for the antenna ports 0 and 1 are transmitted. If the number of transmitting antennas is four, the CRS for the antenna ports 0 to 3 are respectively transmitted.

FIG. 6 is a diagram illustrating that CRS and DRS defined in the legacy 3GPP LTE system (for example, release-8) are mapped onto a pair of downlink resource blocks (RBs). A pair of downlink resource blocks (RBs) may be expressed by one subframe on a time domain×twelve subcarriers on a frequency domain as a mapping unit of the reference signal. In other words, a pair of resource blocks on a time axis have a length of 14 OFDM symbols in case of normal cyclic prefix (CP) (FIG. 6(a)) and has a length of 12 OFDM symbols in case of extended cyclic prefix (CP) (FIG. 6(b)).

FIG. 6 illustrates a position of a reference signal on a pair of resource blocks in a system that a base station supports four transmitting antennas. In FIG. 6, resource elements (REs) marked with '0', '1', '2' and '3' represent position of the CRS for each of antenna ports '0', '1', '2' and '3'. Meanwhile, resource elements marked with 'D' represent the position of the DMRS.

DeModulation Reference Signal (DMRS)

The DMRS is the reference signal defined for channel estimation for the PDCSCH through the user equipment. The DMRS may be used in transmission modes 7, 8 and 9. Although the DMRS had been initially defined for single layer transmission of an antenna port 5, the DMRS has been enlarged for spatial multiplexing of maximum eight layers. The DMRS is transmitted for a specific user equipment only as will be aware of it from the user equipment specific reference signal which is another name of the DMRS. Accordingly, the DMRS may be transmitted from the RB only to which the PDSCH for the specific user equipment is transmitted.

Figure 7:
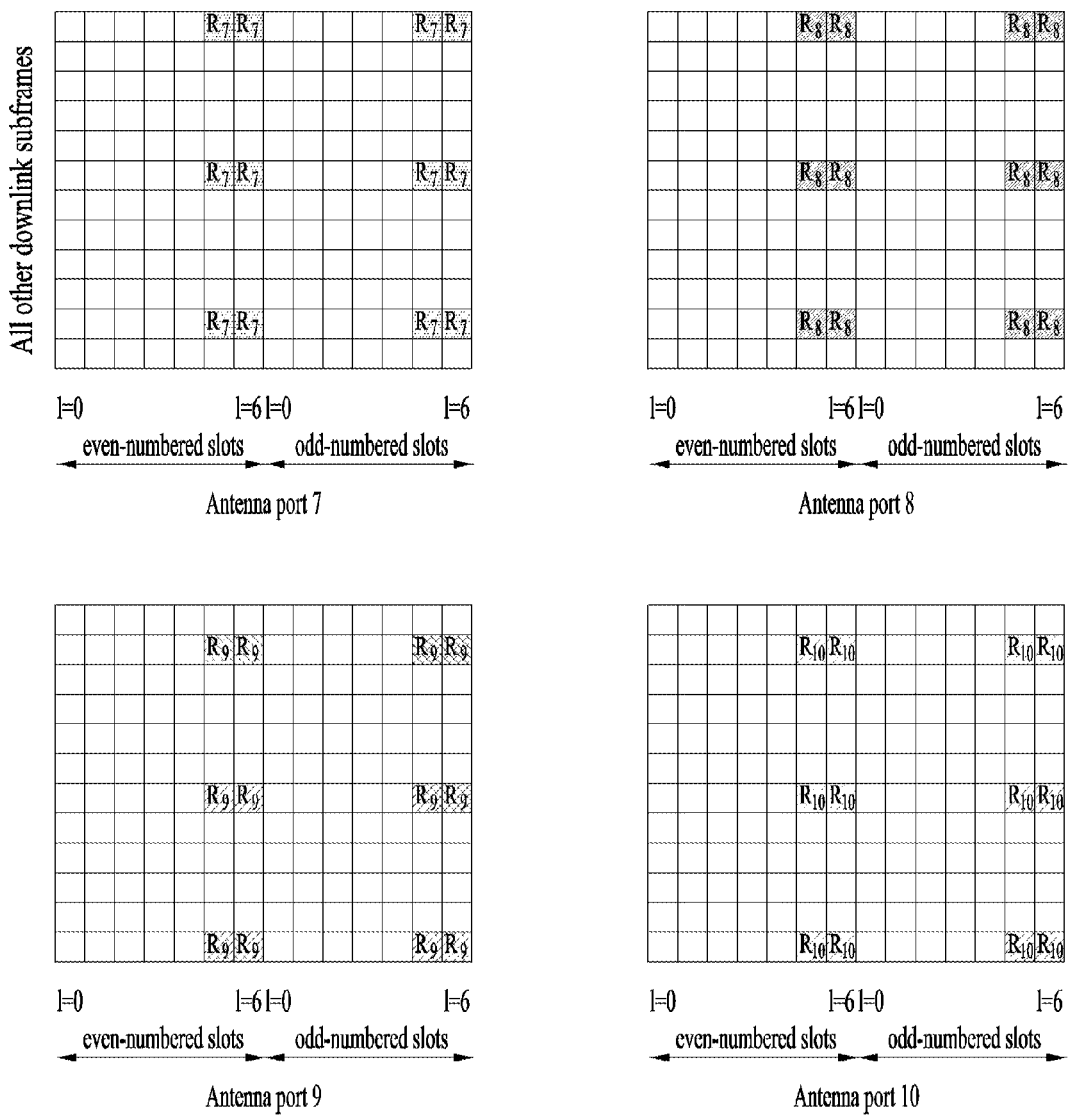
FIG. 7 is a diagram illustrating a modulation reference signal.

Generation of the DMRS for maximum eight layers will be described as follows. The DMRS may be transmitted in such a manner that a reference signal sequence r(m) generated in accordance with the following Equation 3 is mapped into complex-valued modulation symbols $a_{k,l}^{(p)}$ in accordance with the following Equation 4. FIG. 7 illustrates that the DMRS is mapped into a resource grid on a subframe in accordance with the Equation 3 in case of a normal CP, and relates to antenna ports 7 to 10.

$$r(m) = \frac{1}{\sqrt{2}}(1 - 2 \cdot c(2m)) + j\frac{1}{\sqrt{2}}(1 - 2 \cdot c(2m+1)),$$ [Equation 3]

$$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

In this case, r(m) means a reference sequence, c(i) means a pseudo-random sequence, and $N_{RB}^{max,DL}$ means the number of maximum RBs of a downlink bandwidth.

$$a_{k,l}^{(p)} = w_p(l') \cdot r(3 \cdot l' \cdot N_{RB}^{max,DL} + 3 \cdot n_{PRB} + m')$$ [Equation 4]

$$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB}n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{in case of special subframe configurations 3, 4, 8, 9} \\ l'\bmod 2 + 2 + 3\lfloor l'/2 \rfloor & \text{in case of special subframe configurations 1, 2, 6, 7} \\ l'\bmod 2 + 5 & \text{in case of no special subframe} \end{cases}$$

$$l' = \begin{cases} 0, 1, 2, 3 & n_s\bmod 2 = 0, \text{ and in case of special subframe configurations 1, 2, 6, 7} \\ 0, 1 & n_s\bmod 2 = 0, \text{ and in case of no special subframe configurations 1, 2, 6, 7} \\ 2, 3 & n_s\bmod 2 = 1, \text{ and in case of no special subframes 1, 2, 6, 7} \end{cases}$$

$$m' = 0, 1, 2$$

As will be aware of it from the above Equation 4, an orthogonal sequence $\overline{w}_p(i)$ as illustrated in Table 2 below is used as the reference signal sequence in accordance with an antenna port when the reference signal sequence is mapped into a complex modulated symbol.

TABLE 2

| Antenna port $p$ | [$\overline{w}_p(0)$ $\overline{w}_p(1)$ $\overline{w}_p(2)$ $\overline{w}_p(3)$] |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Enhanced EPDCCH (EPDCCH)

In the LTE system following Release 11, an enhanced-PDCCH (EPDCCH) has been considered as a solution for capacity lack of a PDCCH due to coordinated multi point (COMP) or multi user-multiple input multiple output (MU-MIMO) or PDCCH performance reduction due to inter-cell interference. In the EPDCCH, in order to obtain precoding gain, etc., channel estimation may be performed based on a DMRS, unlike a legacy CRS-based PDCCH.

EPDCCH transmission may be divided into localized EPDCCH transmission and distributed EPDCCH transmission depending on the configuration of physical resource block (PRB) pairs used for EPDCCH transmission. The localized EPDCCH transmission means that ECCEs used for one DCI transmission are adjacent in the frequency domain and specific precoding is applicable in order to obtain beamforming gain. For example, localized EPDCCH transmission may be based on consecutive ECCEs corresponding to an aggregation level. In contrast, the distributed EPDCCH transmission means that one EPDCCH is transmitted in separated PRB pairs in the frequency domain, and has frequency diversity gain. For example, the distributed EPDCCH transmission may be based on an ECCE comprised of four EREGs which are respectively included in the separated PRB pairs in the frequency domain. One or two EPDCCH PRB sets may be configured for the user equipment through higher signaling, and each EPDCCH PRB set may be intended for any one of the localized EPDCCH transmission and the distributed EPDCCH transmission. If two EPDCCH PRB sets exist, all or some of the two sets may be overlapped.

Figure 8:
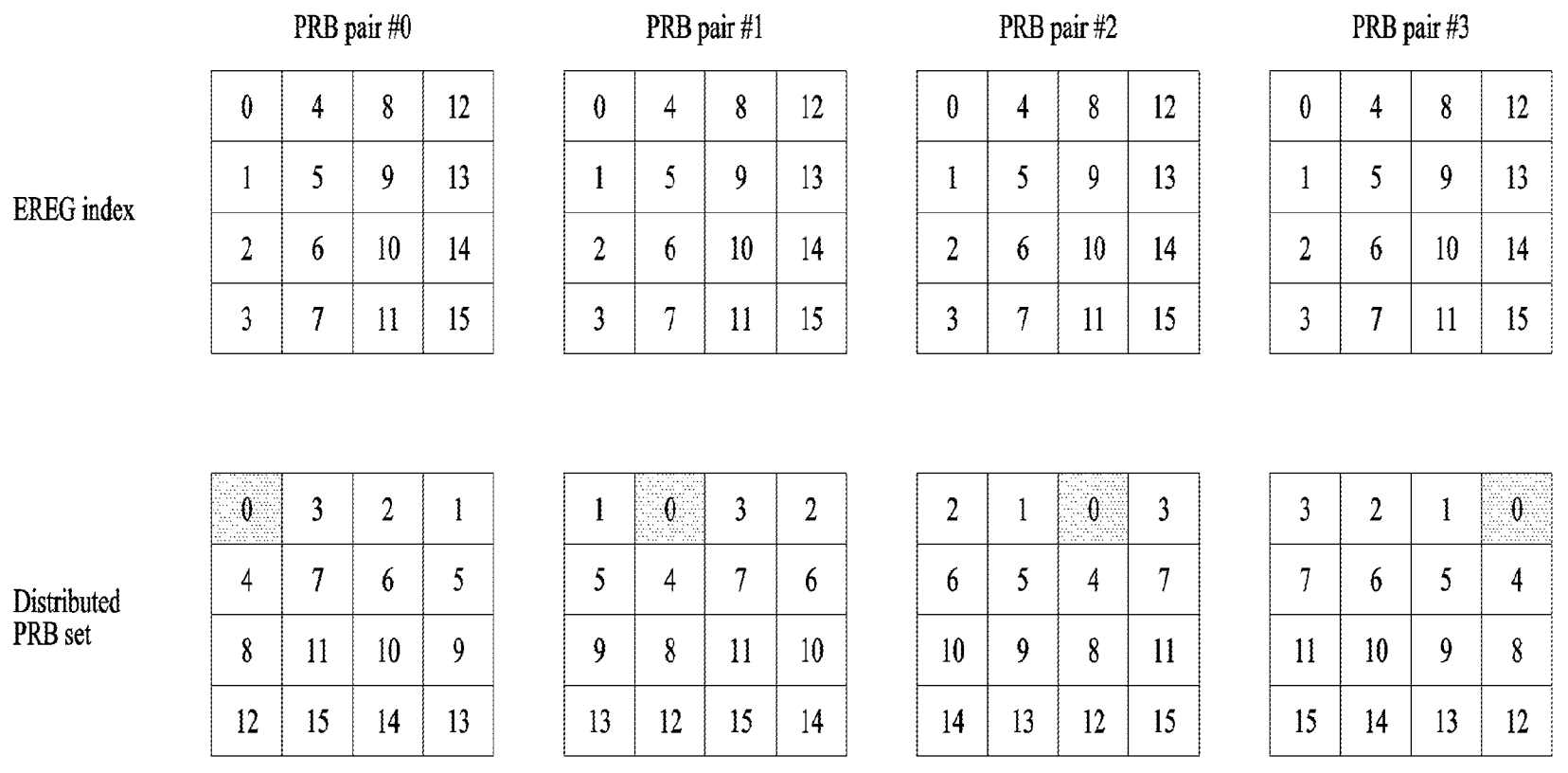

The base station may transmit control information by mapping the control information into REs of EREG allocated for the EPDCCH from one or more EPDCCH PRB sets. In this case, the EREGs are used to define mapping of a control channel in RE, and 16 EREGs (EREG numbers 0 to 15) may exist for one PRB pair. Four EREGs (or eight EREGs as the case may be) may constitute one ECCE, and x number of ECCEs (x is any one of 1, 2, 4, 8, 16 and 32) may constitute one EPDCCH. In case of the distributed EPDCCH transmission, EREGs existing in several PRB pairs may constitute one ECCE for diversity. In more detail, in case of the distributed EPDCCH transmission, EREG to ECCE mapping (hereinafter, first ECCE number-EREG number-PRB number relation) may mean that ECCE index in the EPDCCH PRB set corresponds to EREG index $\lfloor n/N_{RB}^{X_m} \rfloor + jN_{ECCE}^{RB}$ in the PRB pair index $(n+j \max(1, N_{RB}^{X_m}/N_{EREG}^{ECCE})) \bmod N_{RB}^{X_m}$. In this case, n means an ECCE number, $N_{RB}^{X_m}$ means the number of PRB pairs included in the EPDCCH set Xm, $N_{EREG}^{ECCE}$ means the number of EREGs per ECCE, $N_{ECCE}^{RB}$ means the number of ECCEs per PRB pair, and $j=0, 1, \ldots, N_{EREG}^{ECCE}-1$. For example, if four PRB pairs are included in the EPDCCH PRB set, according to the aforementioned first ECCE number-EREG number-PRB number relation, ECCE index 0 is comprised of EREG 0 of PRB pair 0, EREG 4 of PRB pair 1, EREG 8 of PRB pair 2, and EREG 12 of PRB pair 4. This EREG to ECCE mapping relation is shown in FIG. 8.

The user equipment may perform blind decoding similarly to the legacy LTE/LTE-A system to receive/acquire control information (DCI) through the EPDCCH. In more detail, the user equipment may attempt (monitor) decoding with respect to a set of EPDCCH candidates per aggregation level, for DCI formats corresponding to a set transmission mode. The set of EPDCCH candidates to be monitored may be referred to as an EPDCCH UE-specific search space and this search space may be set/configured per aggregation level. In addition, the aggregation level may be {1, 2, 4, 8, 16, 32} depending on subframe type, CP length and the amount of available resources in a PRB pair, slightly differently from the aforementioned legacy LTE/LTE-A system.

In case of the user equipment in which an EPDCCH is configured, REs included in PRB pairs are indexed with EREGs, and these EREGs may be indexed with ECCE units. EPDCCH candidates constituting the search space may be determined based on the indexed ECCEs and blind decoding may be performed, whereby control information may be received.

The user equipment that has received the EPDCCH may transmit ACK/NACK for the EPDCCH onto the PUCCH. At this time, resources which are used, that is, index of the PUCCH resources may be determined by the lowest ECCE index of ECCEs used for EPDCCH transmission. That is, the index of the PUCCH resources may be expressed by the following Equation 5.

$$n_{PUCCH\text{-}ECCE}^{(1)} = n_{ECCE} + N_{PUCCH}^{(1)} \quad \text{[Equation 5]}$$

In the Equation 2, $n_{PUCCH\text{-}ECCE}^{(1)}$ means the PUCCH resource index, $n_{ECCE}$ means the lowest ECCE index of ECCEs used for EPDCCH transmission, and $N_{PUCCH}^{(1)}$ (which may be referred to as $N_{PUCCH,EPDCCH}^{(1)}$) is a value transferred through higher signaling and means a point where the PUCCH resource index is started.

However, if the PUCCH resource index is determined uniformly by the aforementioned Equation 5, a problem of resource contention may occur. For example, if two EPDCCH PRB sets are configured, since ECCE indexing in each EPDCCH PRB set is independent, the lowest ECCE index in each EPDCCH PRB set may exist equally. In this case, a start point of the PUCCH resource may be varied depending on a user to solve the problem. However, if the start point of the PUCCH resource is varied depending on a user, many PUCCH resources are reserved to lead to be inefficient. Also, since DCI of several users may be transmitted at the same ECCE location in the EPDCCH like MU-MIMO, a method for allocating PUCCH resources by considering such transmission will be required. In order to solve this problem, ARO (HARQ-ACK Resource Offset) has been introduced. The ARO shifts the lowest ECCE index of ECCE indexes constituting the EPDCCH, PUCCH resource determined by start offset of the PUCCH resources transferred through higher layer signaling, to a predetermined level, so as to avoid contention of the PUCCH resources. The ARO is indicated as illustrated in Table 3 below through 2 bits of DCI formats 1A/1B/1D/1/2A/2/2B/2C/2D transmitted through the EPDCCH.

TABLE 3

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

The base station may designate any one of ARO values in Table 3, for a specific user equipment, and then may notify the specific user equipment of ARO, which will be used when the PUCCH resource is determined, through the DCI format. The user equipment may detect an ARO field from its DCI format, and may transmit ACK/NACK through the PUCCH resource determined by using the detected value.

In addition to the introduction of the EPDCCH, introduction of an EPHICH has been considered. In particular, in a new carrier type (this carrier may also be used for carrier aggregation, etc.) from which the legacy control channel or reference signal is excluded, introduction of an EPHICH more advanced than the legacy PHICH may be more preferred. Therefore, a resource, structure, etc. of an EPHICH according to the embodiment of the present invention will be described hereinafter.

Shortened DMRS and EPHICH Structure

The EPHICH according to the embodiment of the present invention may be related to a use of a shortened DMRS and available resources generated by the use of the shortened DMRS. As described above, the DMRS may be transmitted through 24 REs in case of a normal CP and a normal subframe. The resource region may be reserved for the DMRS. However, in a stable environment that sufficient SINR is assured or channel properties are little changed, such as a small cell environment, predetermined channel estimation performance may be obtained even without 24 REs. In more detail, in case of a normal CP and a normal subframe, 24 REs are comprised of 6 groups where a total of 4 REs including two symbols continuous on a time axis and 2 REs continuous on a frequency axis are grouped. A start point of each group becomes subcarriers 1, 6 and 11 of the OFDM symbol #5 of each slot. At this time, the four REs which belong to one group may have channel estimation values very similar to one another in an environment that Doppler frequency is not great. Therefore, some REs of REs reserved for the DMRS included in the group may be used, and will be referred to shortened DMRS.

REs to which the shortened DMRS is transmitted may be determined cell-specifically. As a result, advantages, such as reduction of overhead of the DMRS, acquisition of resources for the EPHICH, and mitigation of interference between neighboring cells, may be obtained. FIG. 9(a) illustrates an example of the shortened DMRS determined cell-specifically as above. Referring to FIG. 9(a), the REs to which the shortened DMRS is transmitted may correspond to one (REs for DM-RS pattern #n, n=0, 1, 2, or 3) of four groups into which REs capable of being reserved for the legacy DMRS are divided. At this time, the DMRS pattern may be determined depending on cell ID (that is, cell-specifically), and may be determined using the LSB of cell ID as a v-shift value and using the second LSB as a h-shift value as shown in FIG. 9(b). In other words, the REs to which the shortened DMRS is transmitted may be obtained in such a manner that REs corresponding to the subcarriers 0, 5 and 10 of the OFDM symbol #5 of each slot are shifted to the frequency axis as much as the LSB and shifted to the time axis as much as the second LSB. If the shortened DMRS is used as above, the EPHICH may be transmitted on the REs adjacent to the REs to which the shortened DMRS is transmitted. For example, if the DMRS pattern 0 of FIG. 9(a) is used as the shortened DMRS, the EPHICH may be transmitted on REs (REs for EPHICH) except the shortened DMRS, among the REs capable of being reserved for the DMRS as illustrated in FIG. 10(a). The EPHICH resource is determined depending on the shortened DMRS and the shortened DMRS is determined cell-specifically, whereby the EPHICH resource may be determined cell-specifically. Moreover, among the resources to which the EPHICH is transmitted, resources for a specific user equipment may be determined user equipment-specifically. For example, as illustrated in FIG. 10(b), the REs for the EPHICH may be divided into three groups/patterns, each of which may be determined by UE ID. In general, supposing that the EPHICH region is divided into n number of patterns, an EPHICH pattern which is used may be determined by EPHICH pattern #=UE ID mod n.

As another example of the shortened DMRS, only one of two continuous OFDM symbols may be used. If antenna ports 107 and 109 are used, the antenna port 107 may use OFDM symbols 5 and 12, and the antenna port 109 may use OFDM symbols 6 and 13.

Figure 11:
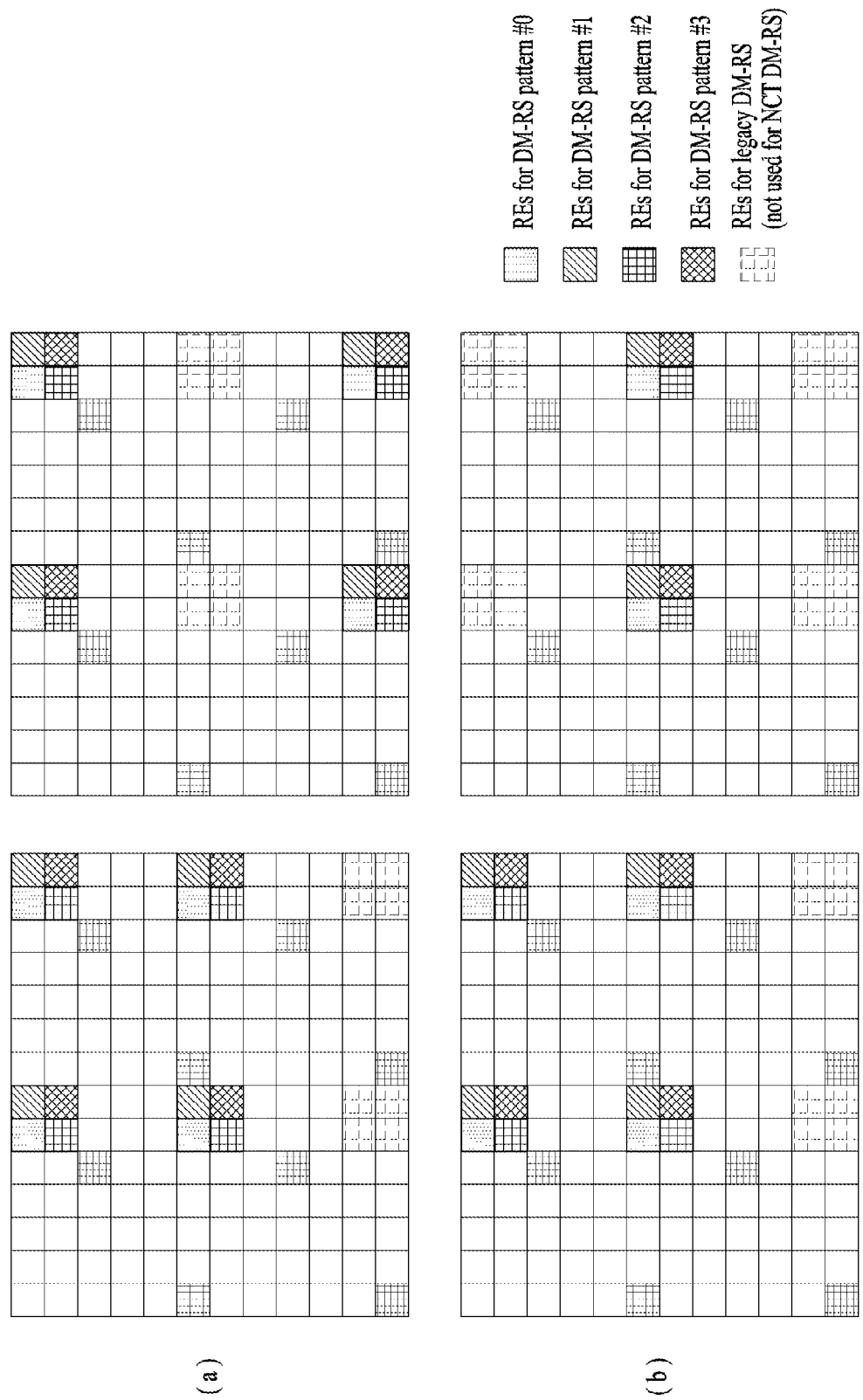

Alternatively, the shortened DMRS may be transmitted in some of 6 RE groups which are resources that may be used for the DMRS. This method may be used by combination with the aforementioned cell-specific shortened DMRS. For example, as shown in FIG. 11(a), four of six groups may be used. In this case, the four groups may be cell-specific DMRS patterns. An example that two of the six groups are used for the shortened DMRS is shown in FIG. 11(b).

Figure 12:
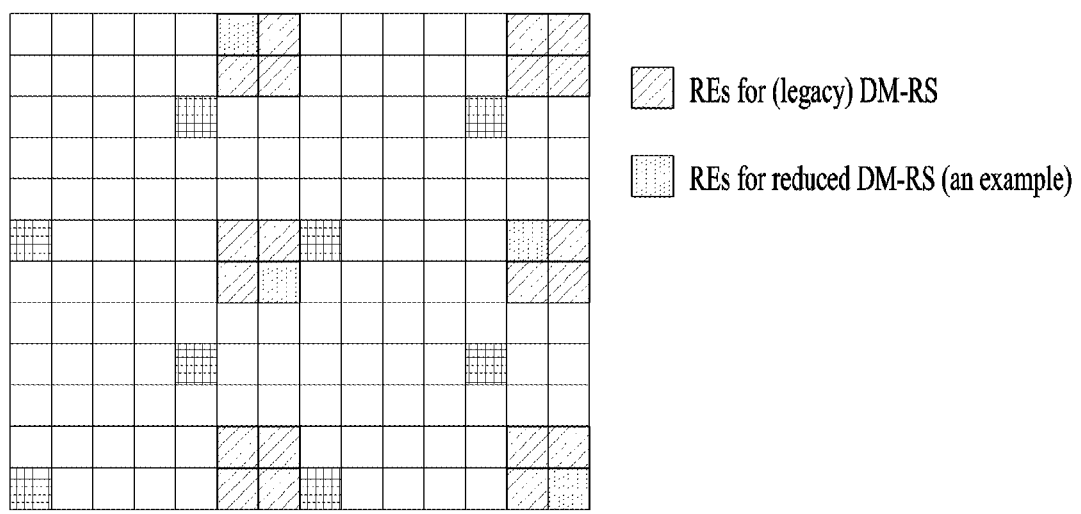

FIG. 12 illustrates that four of the six groups are selected and at the same time one RE of each group is used as RE for the DMRS. In this case, 20 idle REs are generated, and may be used for the EPHICH.

Figure 13:
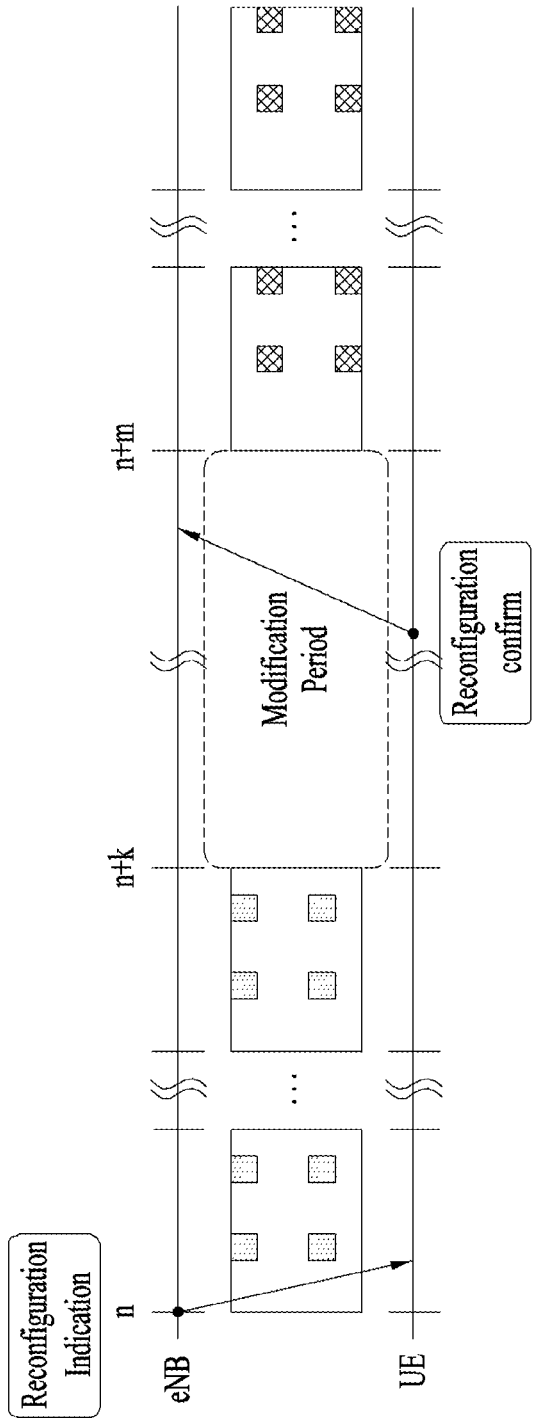
FIG. 13 is a diagram illustrating a modification period according to the embodiment of the present invention.

The aforementioned shortened DMRS pattern may be used in a subframe/PRB pair where the EPHICH is configured or subframe/PRB pairs indicated by RRC signaling, etc. Also, the shortened DMRS pattern may be used as one or more of the aforementioned patterns are changed if necessary. The use of the shortened DMRS pattern may generate a modification period. In more detail, the general use of the DMRS may be switched to the user of the shortened DMRS, or the use of the shortened DMRS may be switched to a use of another shortened DMRS through reconfiguration. In this case, an ambiguity period may be generated between a timing point when the base station configures the use of the shortened DMRS and a timing point when the user equipment actually applies the use of the shortened DMRS. Such a modification period is illustrated in FIG. 13.

In order to reduce ambiguity during the modification period, the following methods may be used.

First of all, the PHICH may be operated in a fallback mode during the modification period. That is, the PHICH may be transmitted from another (predetermined) area other than the aforementioned EPHICH region or different carriers/a specific area on different carriers. A fallback area on the same carrier may be any one of regions for the EPHICH, which are described as follows. A fallback area on different carriers may be a PHICH/EPHICH region existing in a legacy carrier or an EPHICH region existing at additional associated carrier. At this time, the different carriers may be indicated by RRC signaling, etc., or may previously be configured.

Second, (if it is difficult to perform fallback operation) HARQ process may be stopped/suspended for the modification period. In this case, the user equipment may regard that ACK is always received for uplink transmission. Alternatively, the user equipment may perform automatic retransmission by regarding that NACK is always received for uplink transmission. At this time, the maximum number of retransmission times may be applied to automatic retransmission, and the base station may perform demodulation by identifying that the retransmission is redundant retransmission. If the user equipment acquires information on reconfiguration, new HARQ process may be performed even before the modification ends.

In case of adaptive retransmission, retransmitted resources may be determined uplink (UL) grant. Since NDI exists in the DCI which includes uplink grant, ACK/NACK may be determined even without the EPHICH. If the user equipment may receive the EPDCCH for the modification period, the user equipment may determine whether the base station receives uplink data even without the EPHICH. Therefore, the general DMRS not the shortened DMRS may always be used for the modification period.

Another EPHICH Structure

Figure 14:
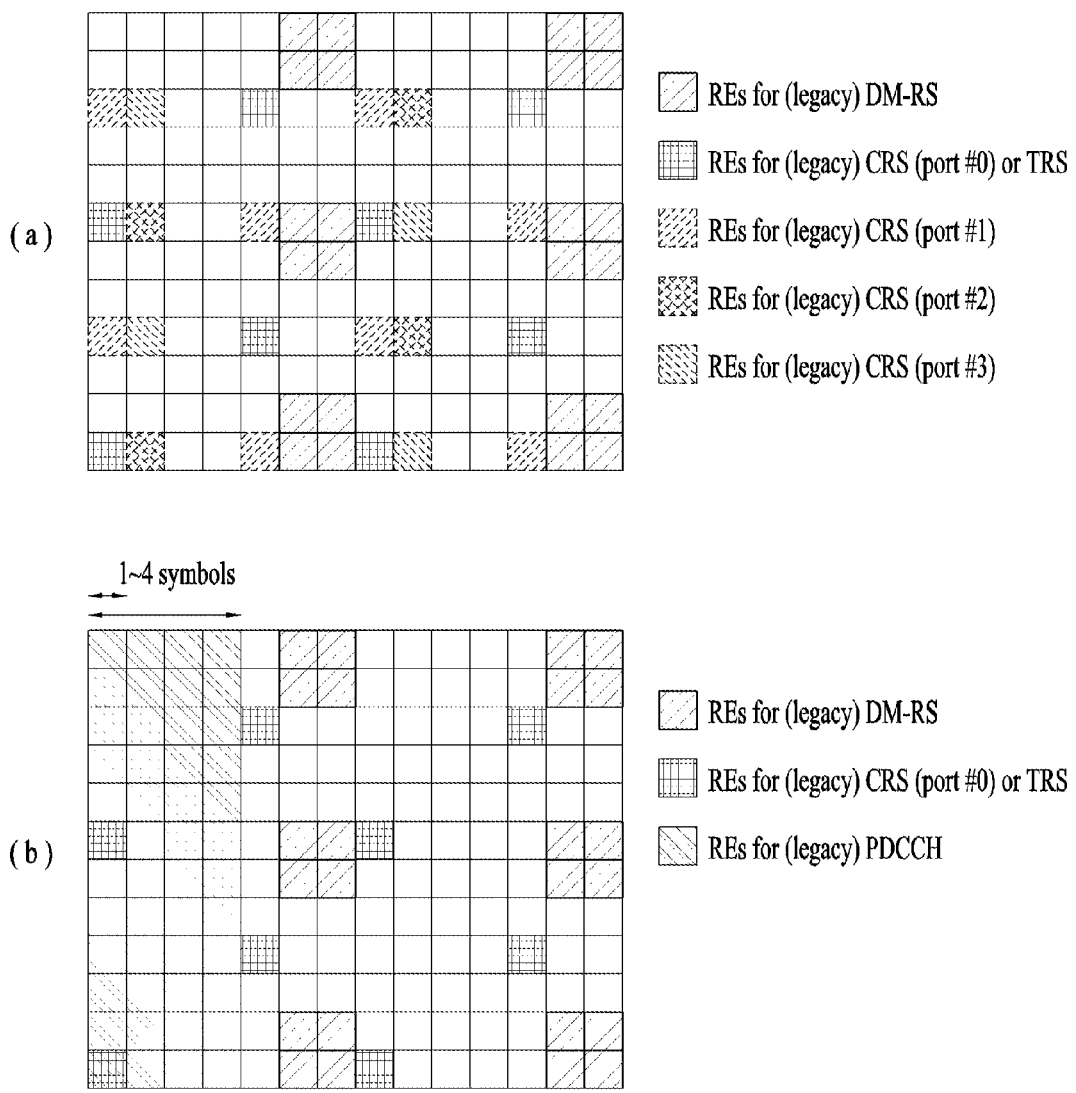
FIGS. 14 and 15 are diagrams illustrating another EPHICH structure according to the first embodiment of the present invention.
Figure 15:
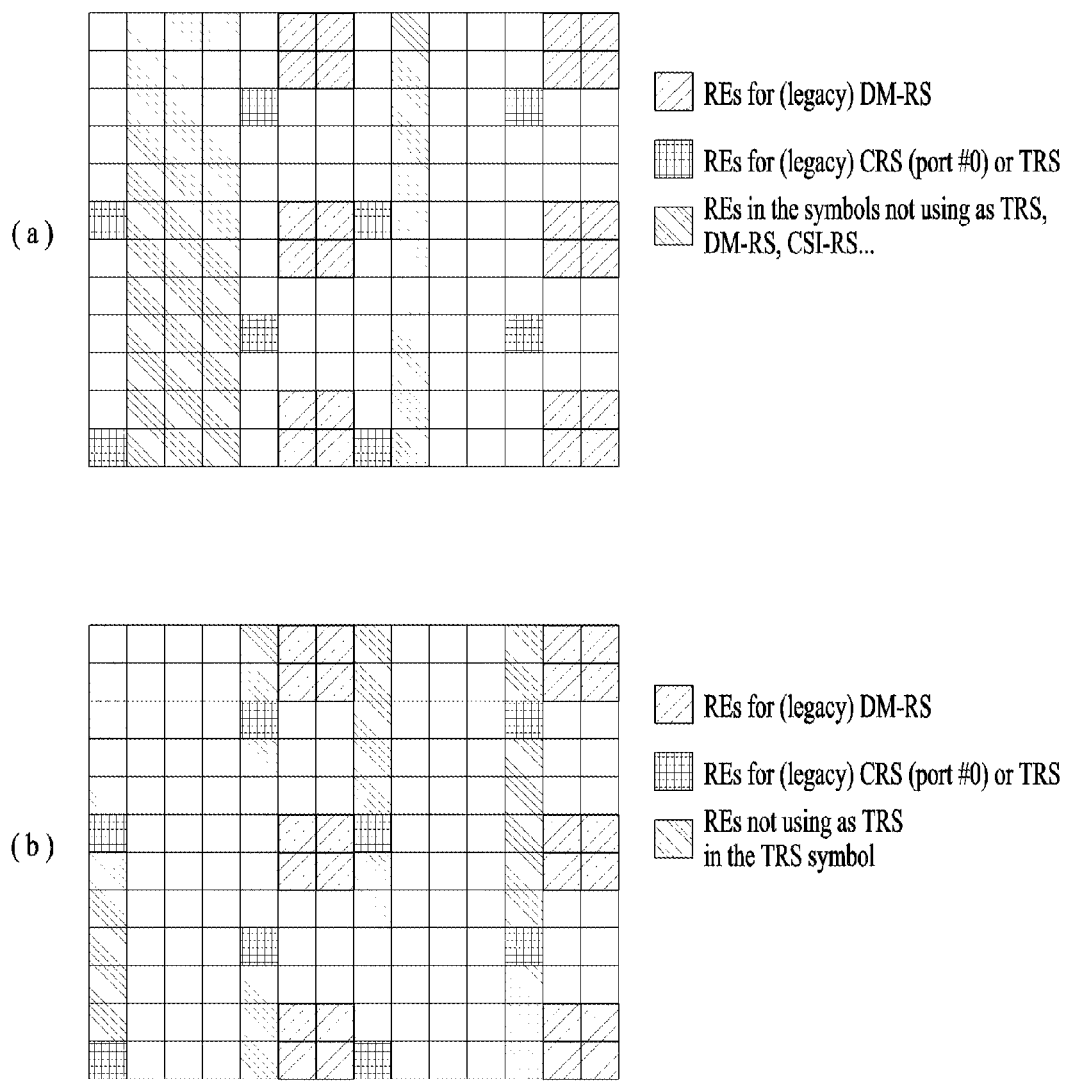

Hereinafter, an EPHICH structure according to another embodiment of the present invention will be described with reference to FIGS. 14 and 15.

Referring to FIG. 14(a), it is noted that RE used as the legacy CRS is used for the EPHICH. Since there is no transmission of the CRS in the NCT, etc., the CRS may be used for the EPHICH, and a problem of interference between cells or interference with the legacy CRS may be solved using v-shift properties of the CRS.

FIG. 14(b) illustrates that the legacy PDCCH region is used as the EPHICH region. The example of FIG. 14(b) is based on that there is no transmission of the PDCCH in the NCT, and RE to which a tracking reference signal (TRS) is transmitted may be excluded from the example of FIG.

14(b). Also, since the PDCCH region includes maximum four OFDM symbols, the EPHICH may be transmitted on one to three OFDM symbols unlike the shown disclosure.

FIG. 15(a) illustrates transmission of the EPHICH based on symbols which are not used as TRS, CSI-RS and/or DM-RS. The case shown in FIG. 15(a) is an example of a normal CP. In case of an extended CP, OFDM symbols #1, #2, #7 and #8 may be used for the EPHICH.

In FIG. 15(b), it is noted that the EPHICH is configured using the other REs except RS from OFDM symbols to which the TRS is transmitted. The TRS is transmitted to OFDM symbols #0, #4, #7 and #11 in case of the normal CP, and is transmitted to OFDM symbols #0, #3, #6 and #9 in case of the extended CP. The EPHICH is transmitted in the other REs except REs to which the TRS is actually transmitted.

Although any one of the aforementioned EPHICH structures may be used independently, two or more of the aforementioned EPHICH structures may be used in combination. For example, in FIG. 14(b) and FIG. 15(b), all of REs used as the EPHICH may be used for the EPHICH.

EPHICH Region

Meanwhile, the EPHICH may exist on a PRB pair configured as the EPDCCH (FIG. 16(a)). For example, if any one of the aforementioned EPHICH structures is used, a case where a size of an EPDCCH set assures sufficient REs for the PHICH may correspond to the case where the EPHICH may exist on the PRB pair. In other words, EPHICH set $\subset$ EPDCCH set may be obtained. In this case, (the aforementioned) EPHICH structure which is used may be varied depending on the size of the EPDCCH set. For example, if the size of the EPDCCH set is 2 RBs, the EPHICH structure shown in FIG. 15 may be used (a structure obtained by combination of all of the EPHICH structures according to the embodiment may be used), and if the size of the EPDCCH set is 8 RBs, the EPHICH structure shown in FIG. 14(a) may be used. The structure shown in FIG. 15(a) may be used continuously, and for a configuration (ePHICH group=12 REs) fixed regardless of the EPDCCH set size, a size of an EPHICH set (region where EPHICHs are configured) may be set to correspond to the size of the EPDCCH set. To this end, the following Equation 6 may be used.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 6]}$$

In the above Equation, $N_g$ is a value given by a higher layer and may have a value such as $N_g$ is $\in \{1/6, 1/2, 1, 2\}$, and $N_{RB}^{DL}$ is the number of RBs constituting a downlink subframe. For example, if the size of the EPDCCH set is 2 RBs, it may be considered that a maximum value of $N_g$ is limited to $1/2$, and if the size of the EPDCCH set is 4 RBs, it may be considered that the maximum value of $N_g$ is limited to 1. (More preferably, the maximum value of $N_g$ may be determined considering both the size of the EPDCCH set and the value of $N_{RB}^{DL}$.)

Subsequently, the EPHICH may be defined in a PDSCH region only except the EPDCCH set as shown in FIG. 16(b). In this case, the size of the EPHICH resource is very great and resources that may be provided for the EPHICH per PRB pair may be restricted. That is, EPHICH set $\subset$ EPDCCH set$^C$ may be obtained.

As combination of the aforementioned methods, EPHICH set $\subset$ U may be obtained (in this case, U means an entire set that may be owned by the EPHICH set, that is, a set comprised of all PRB pairs of the downlink subframe, and the EPHICH set may mean a full band or a set corresponding to some of all the PRB pairs (regardless of the fact that the PRB pairs are included in the EPDCCH set). In this case, all of valid EPHICH resources may be used, or some of the valid EPHICH resources may be used. If some of the valid EPHICH resources are used, a position, the allocated order, etc. of the resources may be designated through higher layer signaling or physical signaling, or may be determined previously. Supposing that each pair performs configurable EPHICH resource allocation in accordance with the sizes of the EPDCCH set and the EPHICH set, only one symbol per PRB pair may be used, or five symbols per PRB pair may be used. At this time, a type and allocation order of the symbols which are used may be designated through higher layer signaling or physical signaling, or may be determined previously as follows. For example, the corresponding symbols may be allocated with a priority in the order of OFDM symbols #1=>#8=>#3=>#2 to obtain maximum time diversity. Alternatively, in order to avoid collision with resources corresponding to a PDCCH region of the legacy carrier, the corresponding symbols may be determined previously to be allocated with a priority in the order of OFDM symbols #8=>#3=>#2=>#1.

As another example, if resources constituting the EPHICH in each PRB pair have a certain number of REs (12 REs) per symbol as shown in FIG. 15(a), the EPHICH resources may be coordinated to avoid EPHICH interference between neighboring transmission points in a symbol domain or a PRB pair domain, or in both two domains.

If the EPHICH is allocated in the EPDCCH region only, the number of REs allocated to the EPHICH per PRB pair may be fixed to a certain value depending on application of configurability based on the sizes of the EPDCCH set and the EPHICH set. In this case, since the size and position of the EPHICH resource are values that may be predicted, except for the predictable values, the number (N_EPDCCH) of valid REs of the EPDCCH may be obtained. On the other hand, the number of REs allocated to the EPHICH per PRB pair may be varied. In this case, the N_EPDCCH may be determined by disregarding the existence of the EPHICH. The number of (E)CCEs per PRB pair and a minimum set level for configuring the EPDCCH may be determined through the N_EPDCCH determined as above.

Configuration of Apparatus According to the Embodiment of the Present Invention

Figure 17:
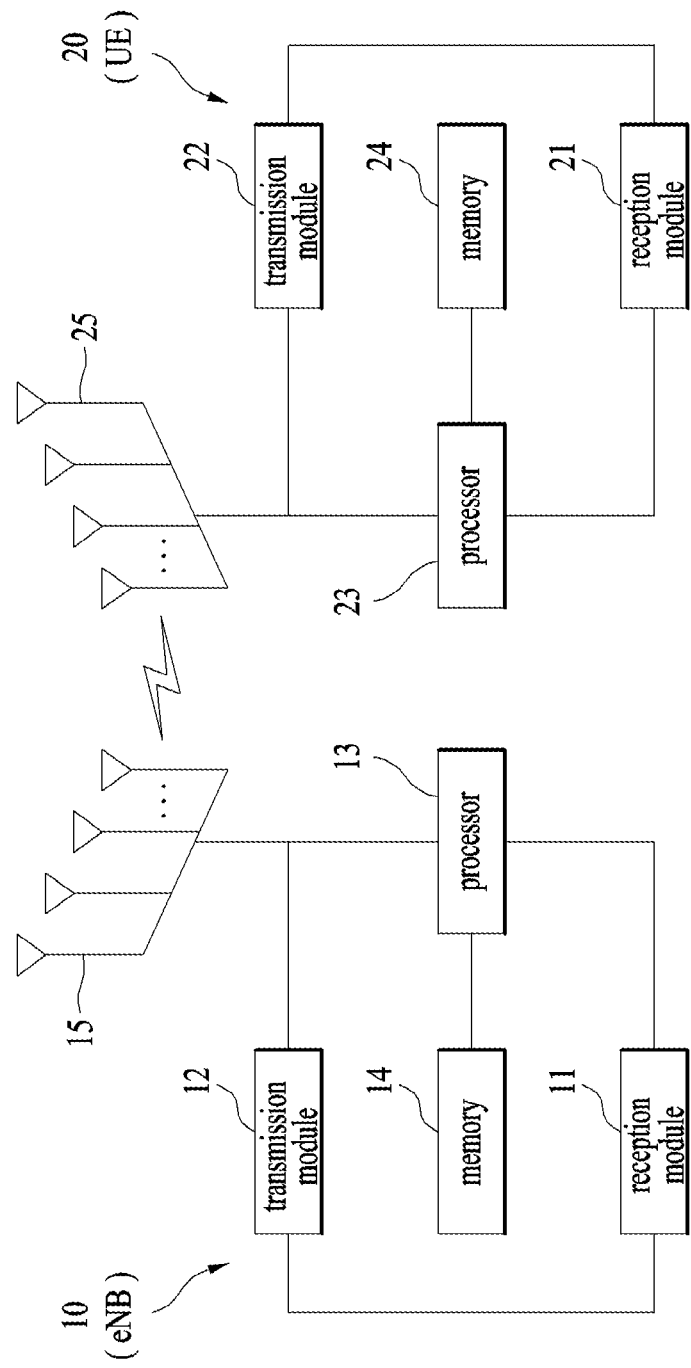
FIG. 17 is a diagram illustrating a configuration of a transceiving apparatus.

FIG. 17 is a diagram illustrating configurations of a transmission point and a user equipment UE according to the embodiment of the present invention.

Referring to FIG. 17, a transmission point 10 according to the present invention may include a reception module 11, a transmission module 12, a processor 13, a memory 14, and a plurality of antennas 15. The plurality of antennas 15 mean the transmission point that supports MIMO transmission and reception. The reception module 11 may receive various signals, data and information on an uplink from the user equipment. The transmission module 12 may transmit various signals, data and information on a downlink to the user equipment. The processor 113 may control an overall operation of the transmission point 10.

The processor 13 of the transmission point 10 according to one embodiment of the present invention may perform operations necessary for the embodiments described above.

The processor 13 of the transmission point 10 may function to computationally process information received by the transmission point 10 or information to be transmitted to the outside, etc. The memory 14, which may be replaced with an element such as a buffer (not shown), may store the computationally processed information for a predetermined time.

Subsequently, referring to FIG. 17, the user equipment UE 20 according to the present invention may include a reception module 21, a transmission module 22, a processor 23, a memory 24, and a plurality of antennas 25. The plurality of antennas 25 mean the user equipment that supports MIMO transmission and reception. The reception module 21 may receive various signals, data and information from a base station eNB on a downlink. The transmission module 22 may transmit various signals, data and information to the base station on an uplink. The processor 23 may control an overall operation of the user equipment 20.

The processor 23 of the user equipment 20 according to one embodiment of the present invention may perform operations necessary for the embodiments described above.

The processor 23 of the user equipment 20 may function to computationally process information received by the user equipment 20 or information to be transmitted to the outside, and the memory 24, which may be replaced with an element such as a buffer (not shown), may store the computationally processed information for a predetermined time.

The detailed configurations of the transmission point and the user equipment as described above may be implemented such that the above-described embodiments are independently applied or two or more thereof are simultaneously applied, and description of redundant parts will be omitted for clarity.

Also, description of the transmission point 10 in FIG. 17 may also be applied to a relay which serves as a downlink transmitter or an uplink receiver, and description of the user equipment 20 may be equally applied to a relay which serves as a downlink receiver or an uplink transmitter.

The aforementioned embodiments of the present invention may be implemented through various means, for example, hardware, firmware, software, or a combination thereof.

When implemented by hardware, the method according to the embodiments of the present invention may be embodied by one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, the method according to the embodiments of the present invention may be embodied by a module, a procedure, or a function that performs the functions or operations described above. Software code may be stored in a memory unit and executed by a processor. The memory unit is located at the interior or exterior of the processor and may transmit and receive data to and from the processor via various known means.

The detailed description of the preferred embodiments of the present invention disclosed as above has been provided such that those skilled in the art may embody and carry out the present invention. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention may be applied to various mobile communication systems.

The invention claimed is:

1. A method for enabling a user equipment to transmit and receive a signal in a wireless communication system, the method comprising:
transmitting uplink data in a first subframe to a base station; and
receiving an acknowledgement (ACK) for the uplink data on a second subframe associated with the first subframe,
wherein, if a shortened Demodulation Reference Signal (DMRS), whose Resource Elements (REs) correspond to a specific part of REs capable of being reserved for the DMRS, is transmitted in the second subframe, the ACK is received on another part of the REs capable of being reserved for the DMRS except the specific part.

2. The method according to claim 1, wherein the second subframe is either a subframe at which an Enhanced Physical Hybrid automatic repeat request Indicator Channel (EPHICH) is configured, or a subframe indicated through higher layer signaling.

3. The method according to claim 1, wherein the specific part is determined by a first least significant bit (LSB) of a cell identifier (ID).

4. The method according to claim 3, wherein the specific part is obtained by shifting REs corresponding to subcarriers 1, 6 and 11 of an Orthogonal Frequency Division Multiplexing (OFDM) symbol #5 of each slot to a frequency axis as much as the first LSB and shifts the corresponding REs to a time axis as much as a second LSB.

5. The method according to claim 4, wherein the REs capable of being reserved for the DMRS are REs obtained after the corresponding REs are shifted to the frequency axis or the time axis.

6. The method according to claim 5, wherein the specific part is determined UE-specifically among the REs capable of being reserved for the DMRS.

7. The method according to claim 1, wherein the ACK is received on a fallback mode resource for a modification period generated as the specific part is reconfigured.

8. The method according to claim 7, wherein the fallback mode resource exists on a carrier indicated by higher layer signaling.

9. The method according to claim 7, wherein the user equipment regards that the ACK is received for the uplink data for the modification period.

10. The method according to claim 7, wherein the user equipment repeatedly retransmits the uplink data for the modification period.

11. The method according to claim 7, wherein a DMRS which is not shortened is transmitted for the modification period.

12. The method according to claim 1, wherein the shortened DMRS is received on a Physical Resource Block (PRB) pair only to which an Enhanced Physical Downlink Control Channel (EPDCCH) is transmitted.

13. A user equipment for transmitting and receiving a signal in a wireless communication system, the user equipment comprising:
   a Radio Frequency (RF) module; and
   a processor operably coupled with the RF module and configured to:
   transmit uplink data in a first subframe to a base station, and
   receive an acknowledgement (ACK) for the uplink data on a second subframe associated with the first subframe,
   wherein, if a shortened Demodulation Reference Signal (DMRS), whose Resource Elements (REs) correspond to a specific part of REs capable of being reserved for the DMRS, is transmitted in the second subframe, the ACK is received on another part of the REs capable of being reserved for the DMRS except the specific part.

* * * * *